INVENTOR.
Harry E. Rose
BY Morris A. Rabkin
ATTORNEY

Feb. 3, 1959 H. E. ROSE 2,872,508

COLOR-CORRECTION SYSTEMS

Filed Oct. 14, 1953

2 Sheets-Sheet 2

INVENTOR.
Harry E. Rose

BY Morris A. Rabkin

ATTORNEY

United States Patent Office 2,872,508

Patented Feb. 3, 1959

2,872,508

COLOR-CORRECTION SYSTEMS

Harry E. Rose, Haddonfield, N. J., assignor to Radio Corporation of America, a corporation of Delaware Application October 14, 1953, Serial No. 385,959

5 Claims. (Cl. 178—5.2)

This invention relates to color-correction systems for color-reproduction printing processes, and particularly to a system for compensating for non-linearities arising in the printing processes.

In color printing processes, such as letterpress printing, for reproducing an original subject in nature or a painting, a set of photoengravings are prepared from the subject. There are three photoengravings, one for each of the colored inks, cyan, magenta and yellow, and a fourth if black is printed directly with black ink. To prepare the photoengravings, the original subject is separated photographically by making three exposures through three filters usually colored red, green and blue. After processing, there are three different black and white continuous tone negatives or "separations." These negatives individually represent the red, the green and the blue in the original subject. A black separation may be made by a yellow filter exposure, or by other known methods. The four color separation negatives are converted to positives usually by contact printing.

The continuous-tone color separation positives are then dissected by the half-tone process into tiny elements or dots which cannot be readily resolved by the eye. In this way, the graduated tones of the separations are reproduced by the dots, the areas of which vary inversely as the density of the separations. The half-tone process consists of rephotographing the color separations in a special camera equipped with a cross-lined screen on a high contrast negative.

The half-tone negatives are then contact printed onto coated copper plates in an etching process. Light exposure renders the coating on the plates insoluble in water and etching solution, so that the unexposed areas of the coating may be washed away and the plates etched deeply enough to prevent printing on the press. The exposed areas do not etch and these form the printing areas on the plates.

Transparent inks (cyan, magneta, and yellow) are used for printing with these photoengraving plates. Cyan ink is red-absorbing, magenta ink is green-absorbing, and yellow ink is blue-absorbing. These inks are used respectively with the plates made with the red, green and blue filters. In any practical set of inks, the absorption and transmission characteristics of the different colors are incomplete and also overlap. As a result, color-correction of the plates is necessary. This correction has been performed by highly skilled craftsmen who make certain changes in the sizes of the dots in the printing plates. Such correction is a manual process requiring considerable empirical knowledge and employing local etching and tooling. By comparing the original and a proof printed with the plates, the color etcher can make appropriate corrections in the dot sizes. To get a satisfactory match in the printed proof, the local etching and proofing processing may have to be repeated a number of times. This processing is a costly and time-consuming process.

In order to eliminate the hand work on the photoengraving plates required for color-correction, a number of automatic systems have been proposed. One such system is described in an article in the "Journal of the Optical Society of America," volume 38, Number 4, April 1948, entitled "Color-Correction in Color Printing" by Hardy and Wurzburg. This system employs three color separation positives of the original subject, as described above, and produces three or four color-corrected negatives, depending upon whether a three or four color printing process is to be used. These color-corrected negatives are then used in the photoengraving process to produce printing plates which require little or no further color correction by hand.

The system of the article noted above is based on the principle of computing for each area of the original subject a set of ink dot values that have the same tristimulus values as the original in accordance with the characteristics of the particular inks and paper stock to be used. The three uncorrected color separation positives are scanned simultaneously by a light source and three photocells to provide three electrical signals. These three signals and then applied to a computer which computes the required corrections and then provides, as an output, three or four corrected electrical signals. Each of these signals in turn is used to control the intensity of a light to which a sensitized photographic plate is exposed. With the mechanism described in the article, the three uncorrected separation positives are scanned simultaneously while a sensitized photographic plate is exposed to the controlled light. A line by line scan is used and this complete scan is repeated three times while exposing three separate photographic plates, or four times where a four color process is desired. Of course, each time a scan is made a different corrected output signal controls the exposure light. An improved all-electronic system operating in a manner similar to that of the aforementioned article is described in the copending patent application of Haynes, Serial No. 264,117.

While the automatic color-correction systems eliminate much of the hand work by the color etcher on the photoengraving plates, it has been found that some hand etching is still necessary. The reason is that ideally the visual sensitivity of the human eye is linear with respect to density, and logarithmic with respect to reflectance (or brightness) and with respect to transparency. Therefore, in order for the printed proof to be visually a satisfactory match of the original subject, there should be a linear density transformation from subject to final printed reproduction. Expressed in terms of gray scale, the gray scale of the printed reproduction should be linear with that of the original subject. The automatic color-correction apparatus described above operates with signals that are functions of reflectance. The transformation of the signals by the apparatus is essentially linear with respect to density. However, there are non-linear density distortions in the reproduction processes precedent and subsequent to the color correction. In the preparation of the color separation positives that are scanned, there may be photographic density non-linearities. As a result, the information in the form of electrical signals that is produced by the scanning of these positives and entered into the color-correction computer may not be linear with respect to the original subject. Consequently, the color corrected outputs of the computer contain these non-linearities. Likewise, there are density non-linearities in the preparation of the color-corrected negatives and positives that are used in the half-tone process subsequent to the color-correction process.

There are also non-linear density characteristics in the printing process. In letterpress printing, there are density non-linearities in the half-tone process, in the etching and in the printing or proofing in which the inks are impressed upon the paper stock. These non-linearities result in tone distortions and require an undesirable amount of hand work in the photoengravings to produce a satisfactory printed reproduction. A substantial amount of tone distortion remains even with attempts to linearize the printing process by complicated techniques. Similarly, in offset lithography and in gravure printing, there are non-linear density characteristics that result in tone distortion.

Accordingly, it is an object of this invention to provide a novel color-reproduction system in which there is automatic compensation for those tone distortions due to non-linearities in the printing process.

Another object of this invention is to provide a new and improved method and apparatus for a color-reproduction system in which there is automatic compensation for non-linearities in various processes of the system.

Yet another object of this invention is to provide an improved color-correction and reproduction system in which tone distortions due to density non-linearities in photographic and printing processes are automatically compensated for, whereby hand work in the photoengravings is greatly reduced over that heretofore necessary.

These and other objects of this invention are achieved in an embodiment of the present invention which is an improvement over the color-correction system of the article and copending patent application noted above. The three uncorrected color separation positives are scanned simultaneously by a light source and photocells to produce a set of uncorrected electrical signals for each area of the subject. A color-correction computer generates electrical signals having the necessary color-corrections, with a signal for each of the inks to be used. Each of these corrected signals is applied, in turn, to a tone compensator circuit and then used to control the exposure of a color-corrected negative. The tone compensator circuit generates a non-linear density function of the corrected signals which compensates for the density non-linearities in the precedent and subsequent photographic processes and in the printing process. Photographic positives are then printed from the negatives that have incorporated in them the required color-corrections and tone compensations. The positives may be used in the letterpress printing process of half-toning, etching and proofing with less hand work of the photoengravings or none at all to compensate for tone distortions.

The novel features of this invention as well as the invention itself, both as to its organization and mode of operation, may be better understood from the following description when read together with the accompanying drawings, in which.

Figure 1:
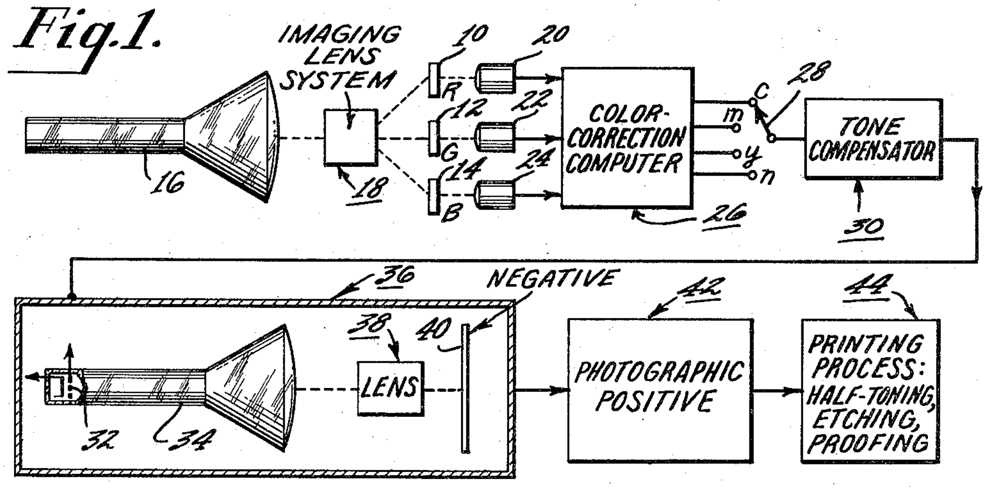
Figure 1 is a schematic block diagram of a color-correction and color-reproduction system embodying the present invention.

Referring now to Figure 1 of the drawings there is shown a color-correction and color-reproducing system embodying this invention. An original subject in color to be reproduced, whether a natural object or a work of art, is photographed, and three transparent color-separation positives 10, 12, 14 are prepared. These color-separation positives may be prepared from negatives that are exposed through red, green and blue filters. A flying spot tube 16 in the form of a cathode-ray tube providing a spot of light is used to scan the three transparencies 10, 12, 14. A lens system 18 images the scanning light spot on corresponding areas of each color separation. The light passing through each color separation 10, 12, 14 is directed by appropriate lenses (not shown) to an associated phototube 20, 22, 24. The phototubes convert the variations of light transmitted through the three transparencies into electrical signal variations. These three electrical signals are applied to the inputs of a color-correction computer 26.

The invention is not limited in its application to any specific form of color-correction system or computer. A preferred form of computer is the one described in the U. S. patent to Hardy et al., No. 2,434,561, which provides a solution of the Neugebauer equations as described in that patent. The computer 26 computes the corrections for the input signals that are required to produce a set of color separations. The computer outputs correspond to corrected electrical signals representing the ink dot sizes or portions of ink of each of the four colors to be printed; namely, cyan, magenta, yellow, and black. One of the computer outputs is selected by a switch 28 and applied to a tone compensator 30 which modifies the signals in accordance with a predetermined non-linear function as described in greater detail below. The output of the tone compensator 30 is applied to the control grid 32 of a second exposing cathode-ray tube 34 which forms a portion of a recording camera system 36. The signals from the tone compensator 30 modulate the intensity of the cathode-ray beam of the exposing tube 34, and the light output from the tube 34 is modulated accordingly. The exposing light is focused through a lens 38 upon a photosensitive negative 40, included in the recording system.

The scanning and exposing systems may be of the type described in the copending patent application of Haynes noted above, in which the vertical deflection coils of the two cathode-ray tubes are connected in series so that the scanning and exposing deflections are synchronized. This invention is not limited in its application to any particular scanning and exposing system; the mechanical system described in the article noted above may also be used.

The scanning cathode-ray tube 16 scans the three separation positives 10, 12, 14 line by line, and, simultaneously, the exposing tube 34 provides a light output which moves in synchronism line by line. Consequently, the photosensitive negative 40 is exposed to a light signal which is modulated in accordance with a color-corrected signal from the computer 26, which is modified, in turn, by the tone-compensator 30. The result is the production of a color-corrected and tone-compensated negative. The scanning cathode-ray tube 16 scans the uncorrected separation positives four times, and each time a different computer output is used to expose a different negative 40 so that four color-corrected negatives are produced. Each of these color-corrected negatives is then used for producing a printing plate in the manner described above. A photographic positive 42 is prepared from each negative in an appropriate manner, for example, by contact printing. The color-corrected positives are then put through the printing process 44. In this process, as described above, half-tone negatives are made that are used to etch photoengraving plates which print the proof or color reproduction.

Figure 2:
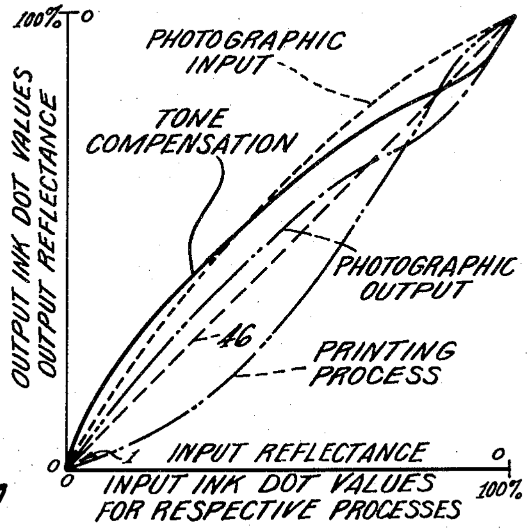
Figure 2 is an idealized graphical diagram of reflectance characteristics of various portions of the apparatus and processes of the color-reproduction system shown in Figure 1.

Referring now to Figure 2, there is shown graphically the characteristics of various portions of the color-reproduction system in terms of the reflectance values and ink dot values; the ink dot and reflectance values are inversely related, so that the ink dot values are on a scale of 0% to 100% of a unit area and the reflectance values on a scale of 1 to 0. The electro-optical scanning system, 16 to 24, the color-correction computer 26, and the recording camera system 36, may all be considered as having substantially linear characteristics in practice; this is shown as a straight line 46 in Figure 2. The same characteristics are plotted in Figure 3 as functions of density, that is to say, on a logarithmic scale; the linear function being the straight line 48.

In the recording of the corrected photographic negative 40 there is a non-linear relationship between the density of the negative and the exposure light. This is the well known photographic S-curve, or density-log exposure characteristic. There is the same type of non-linearity in the preparation of the photographic positive. In the density ranges that are usually utilized, a portion of the toe and the nearly-linear portion of the S-curve are involved, with nearly-linear portions of the curves for the negative and positive having the same slopes. Thus, in the corrected photographic positive there are tone distortions resulting from the two photographic steps of preparing a negative and a positive. The resultant tone distortion is the sum of the two individual distortions; namely, an S-shaped curve, which is shown in Figure 2 labelled "Photographic Output." The same curve is drawn as a function of density in Figure 3, where it is seen the "Photographic Output" characteristic is non-linear with respect to density.

Figure 4:
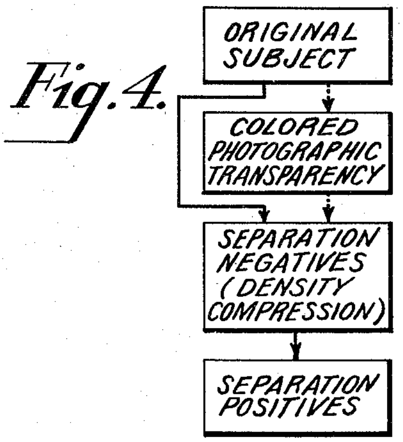
Figure 4 is a schematic block diagram of a system for preparing the color separation positives to be scanned.

As shown in Figure 4, the uncorrected separation positives 10, 12, 14 are prepared through a number of non-linear photographic steps. In one method, a colored transparency may first be made of the original subject. The colored transparency is then separated photographically by means of filters into three separation negatives, from which the uncorrected separation positives are prepared. In another method, the separation negatives may be prepared directly from the original subject. In each of the photographic steps, there are photographic non-linearities of the type described. An additional photographic non-linearity arises from the use of the initial photographic steps for density compression. The density range of the original subject is usually substantially greater than the density range that can be provided in a printed color reproduction, so that density compression must be provided some place in the color-reproduction system. The gammas of the transfer characteristics of the separation negative and positive are chosen to provide the necessary density compression. Considering the method of preparing the color separations directly from the original subject, there is a resultant tone distortion made up of the density non-linearities in the two photographic steps, and, in addition, due to the density compression, a reflectance non-linearity that shows up in the electrical signals produced by scanning the separations. The curve for the tone distortion in the separation positives is labelled "Photographic Input" in Figures 2 and 3. This characteristic is also non-linear with respect to density.

Each of the portions of the letterpress printing process 44, the half-toning, the etching, and the proofing, have non-linear transfer characteristics. The non-linearity in half-toning varies with the techniques employed which include as some of the variables the density range of the photographic positive, the aperture stop of the camera lens, the number of screen lines, the amount of screen separation, the type of diffusion sheet and the photographic development techniques and materials. The etching non-linearity varies with the type of etching (tray or machine or electrolytic etching), and with the type of etching solution including for example, temperature and copper content. The proofing non-linearity is due to the fact that the ink is not impressed uniformly over the area of a dot. Variables in the proofing include the viscosity and amount of ink and the pressure of the printing plate.

Figure 3:
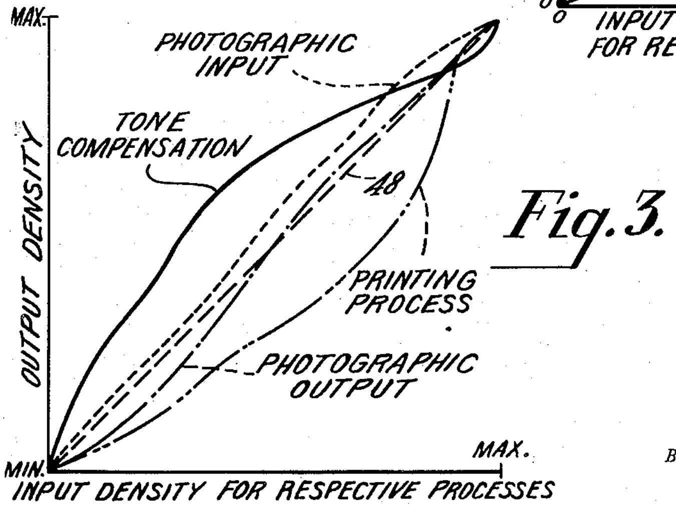
Figure 3 is an idealized graphical diagram of density characteristics of various portions of the apparatus and processes of the color-reproduction system shown in Figure 1.

With any particular set of values for the variables in the printing process, which values are reproducible and provide a sufficiently wide gray scale range, the non-linear characteristic for the entire process may be found and used for tone-compensation. Knowing the gray scale densities of a photographic positive that is processed through the printing process to a printed reproduction, and plotting these densities against the measured densities of the printed proof, the gray scale distortion in the entire printing process is exhibited by the differences between the two sets of densities. The non-linear characteristic of a particular printing process is shown in Figures 2 and 3 as the curve labelled "Printing Process." This curve is based on a printing process employing standard halftoning without highlight boost, standard tray etching, and standard proofing technique.

The non-linear density characteristics of the printing process varies throughout the printing industry due to variations in techniques and materials. However, it has been found that generally this curve has the same overall shape. There is a loss of ink value in the printing process through most of the range of ink dot and density values. This ink loss is represented by the area between the ideal linear characteristic 46, 48 and the printing process characteristic. At the shadow end of the ink dot range, at about 85% to 90%, the curve crosses above the linear characteristic, so that there is an excess of ink in the shadow region. The slope of the ink dot compensator curve is about half the slope of the ideal characteristic 46 for about the first 20% of the range of ink dot values, and even less in the first 5% of the range. This represents a substantial loss in tone or gray-scale gradations in highlight ranges, and, thus, a loss in detail in this region. The slope of the curve is greater and approximately constant in the rest of the ink dot range, except for the last 5 to 10%. In the range of about 90% to 100%, the slope decreases and is less than the slope of the linear characteristic, indicating a loss in gray-scale gradations in the shadow region, corresponding to the excess of ink in this region, and, thus, a loss in shadow detail.

The purpose of the tone-compensator 30 is to modify the outputs of the color-correction computer 26 in accordance with a predetermined function which compensates for all of the non-linear characteristics occurring in the color-reproduction system, so that the printed proof is a linear reproduction of the original subject without tone distortion. This predetermined function has the graphical characteristic shown in Figures 2 and 3 labelled "Tone Compensation," which is the inverse of the algebraic sum of the other characteristics about the ideal characteristic. The tone-compensation characteristic is primarily the inverse of the printing process characteristic with small variations to compensate for the relatively small photographic non-linearities. The slope of the tone-compensation curve is relatively steep in the first 5% to 20% of the ink dot range, to provide a tone boost for the highlight tone loss, and the slope increases again in the range of about 90% to 100% to provide a shadow boost for the loss in shadow detail. The highlight boost provided by the tone compensator eliminates the need for a highlight boost in the half-toning which is generally extremely critical and not always reliably reproducible.

Where the scanning, computing or recording apparatus have a non-linear characteristic, the tone-compensation characteristic may be further modified to include this non-linearity.

In the color-reproduction system of Figure 1, the color corrected signals from the computer are modified in accordance with a non-linear density function which is the inverse of the algebraic sum of the non-linearities throughout the system. Accordingly, the color-corrected negative exposed in the recording system has the required color corrections, and is compensated for non-linearities in the uncorrected color-corrected positives, and also for the non-linearities in the photographic and printing processes subsequent to the color-correction. Consequently, tone distortions produced by these non-linearities are cancelled out. The photoengraving plates that are produced require no additional hand work for tone distortion, and may be used for printing color reproductions that are a satisfactory match of the original subject.

Figure 5:
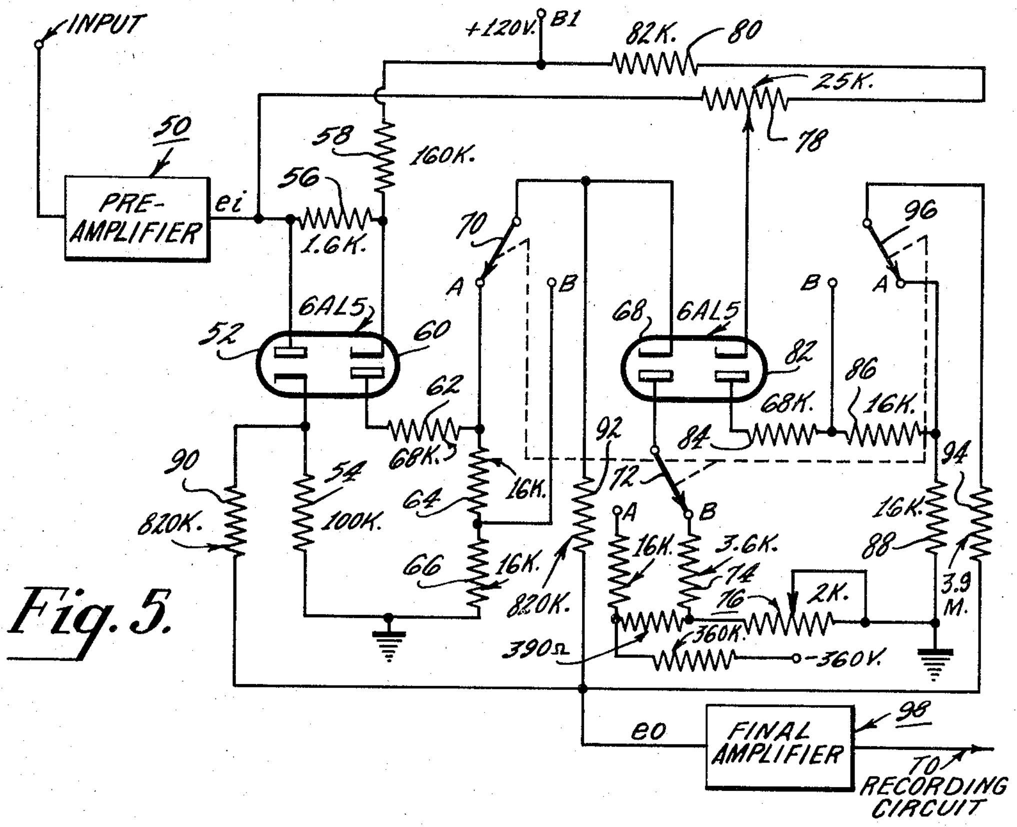
Figure 5 is a schematic circuit diagram illustrating in greater detail a tone-compensator employed in Figure 1.

Referring to Figure 5, there is shown a schematic circuit diagram for compensating for the scanning, photographic recording, and printing process non-linearities shown in Figures 2 and 3. This circuit generates a function in accordance with the tone-compensation curve shown in Figure 2, which curve is non-linear with respect to density as indicated in Figure 3.

The output signals of the color-correction computer of the Hardy patent noted above are in the form of voltages whose amplitudes are proportional to ink dot values. These voltages are amplified in a pre-amplifier circuit 50 (Figure 5) which may be a degenerative current-feedback amplifier for linearity. The output of the pre-amplifier 50 is applied to the anode of a first diode 52, the cathode of which is connected through a load resistor 54 to ground. The output of the pre-amplifier 50 is also connected through a pair of serially connected biasing resistors 56, 58 to the positive side of a voltage source $B_1$. The junction of the biasing resistors 56, 58 is connected to the cathode of a second diode 60. An anode load for the second diode is connected between the second diode anode and ground. This second diode anode load is in the form of a voltage divider made up of three serially connected resistors 62, 64, 66. The cathode of a third diode 68 is connected to the junction of the first and second resistors 62, 64 of the anode load through a first switch 70. The anode of the third diode 68 is connected through a second switch 72 and an anode resistor 74 to an intermediate point on a voltage divider 76 which is connected between ground and a negative voltage source. This voltage divider 76 provides a negative biasing voltage for the anode of the third diode 68. The output of the pre-amplifier 50 is also connected through a second pair of serially connected biasing resistors, 78, 80, one of which is adjustable, to the positive voltage source $B_1$. The cathode of a fourth diode 82 is connected to a tap on the adjustable biasing resistor 78 of the second pair. The anode of the fourth diode 82 is connected to ground through a voltage divider made up of three resistors 84, 86, 88. A first summing resistor 90 is connected at one terminal to the cathode of the first diode 52, one terminal of a second summing resistor 92 is connected through the first switch 70 to the junction of the first and second load resistors 62, 64 of the second diode 60, and a third summing resistor 94 is connected at one end through a third switch 96 to the junction of the second and third anode load resistors 86, 88 of the fourth diode 82. The other ends of the three summing resistors 90, 92, 94 are connected together to an output amplifier 98, which may be a differential amplifier. The output of the output amplifier is applied to the control grid 32 of the exposing cathode-ray tube 34.

In order to illustrate completely an operative embodiment of the circuit, component values and tube types are shown in the circuit diagram of Figure 5. However, such showing is not intended as a limitation on the scope of the invention. The specific circuit components shown in Figure 5 are for a pre-amplifier output range of +.3 volt to −19.7 volts corresponding to a range of ink dot values of 0% to 100%.

Figure 6:
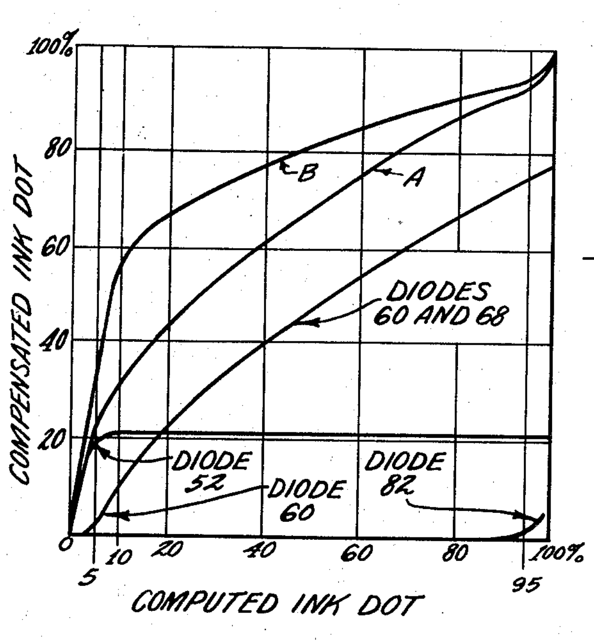
Figure 6 is an idealized graphical diagram of the functions generated by the tone-compensator circuit shown in Figure 4 and of the contributions of different portions of this tone-compensator circuit.

In Figure 6, there is shown a graphical diagram A of the function generated by the circuit of Figure 5 in terms of ink dot values. This curve A is the same as the "Tone Compensation" curve in Figure 2. Also shown, is the portion of the function curve produced by conduction in each of the diodes 52, 60, 68, 82. The sum of these portions, provided by the network of summing resistors 90, 92, 94 is the desired compensating function.

For the input voltage range corresponding to the ink dot values of 0% to 5%, only the first diode 52 conducts. The other diodes are all substantially cut off, so that their anodes remain at ground potential. The voltage change across the load resistor 54 of the first diode is relatively steep in this voltage range. The output voltage for the range of ink dot values of 0% to 5% is substantially that applied to the first summing resistor 90 producing the steep rise in the compensating function curve A in this range. The input voltage corresponding to the ink dot value of 5% is sufficiently negative to terminate conduction in the first diode 52 and also to overcome the positive biasing voltage on the cathode of the second diode 60 provided by the first pair of biasing resistors 56, 58. Accordingly, substantial conduction in the second diode 60 starts at the ink dot value of 5% and continues for the remainder of the full range of ink dot values. The second summing resistor 92 is connected to an intermediate point of the anode load of the second diode 60, so that the voltage change due to conduction in this diode 60 is less steep. This voltage is added to the voltage at the cathode of the first diode 52 by the first and second summing resistors 90, 92, to produce the portion of the function curve A for ink dot values of 5% to 20%. At an input voltage corresponding to an ink dot value of 20%, the voltage at the junction of the first and second anode resistors 62, 64 of the second diode 60 falls sufficiently negative to overcome the negative bias on the anode of the third diode 68. Thus, the third diode 68 conducts shunting a portion of the anode load of the second diode 60. Consequently, the voltage change applied to the second summing resistor 92 is further reduced in slope as required by the function curve A for ink dot values of 20% to 95%. When the negative pre-amplifier voltage corresponds to an ink dot value of 95%, the positive bias on the cathode of the fourth diode 82 is overcome and this tube conducts. A portion of the voltage change across the anode load 84, 86, 88 is applied to the third summing resistor 94 so that there is an increase in slope in the function curve A for ink dot values of 95% to 100%. This increase in slope compensates for the tone loss in the printing process at the shadow end of the tone scale, that is to say, for ink dot values of 95% to 100%. There is a similar boost in tone compensation needed for the tone loss at the highlight end of the tone scale, 0% to 5% ink dot, which is provided by the steep slope of the function curve A in that range. The diodes are operated with operating signal ranges and load conditions tending to start and stop conduction gradually so that a smooth curve is generated.

The curve A in Figure 6 compensates for the non-linearities of one letterpress printing process in the printing industry together with the photographic and scanning non-linearities shown in Figure 2. The curve B in Figure 6 compensates for the non-linearities of another printing process of the same type but using slightly different techniques and materials. For example, in the process of curve B, there is a larger minimum dot size in the half-toning than in curve A. This involves the variables of density range of the positive, aperture stop and exposing light. In the etching of B, a corresponding larger etch time is employed so that the minimum size of the printed dot remains the same. As a result, the curvatures in curve B are greater than those in curve A. The same photographic and scanning non-linearities are included in curve B as in curve A.

The circuit described above may be used to generate the function of curve B with some changes in component values. These changes are provided by switching the three switches 70, 72, 76 to the B position in the circuit shown in Figure 5. The cathode of the third diode 68 and the second summing resistor 92 are then connected to the junction of the second and third anode resistor 64, 66 of the second diode 60; the anode of the third diode 68 has a larger anode resistor 100 connected to a slightly lower bias potential; and the third summing resistor 94 is connected to the junction of the first and second anode resistors 84, 86 of the fourth diode 82. The voltage source $B_1$ is +105 volts and the first biasing resistor 56 is 1800 ohms.

The operation of the circuit is not changed in principle but the compensating curve that is generated has greater curvatures. The slope in the ink dot range of 0% to .5% is provided primarily by conduction in the first diode 52; in the range of .5% to 10% by conduction in the second diode 60; in the range of 10% to 95% by conduction in the second and third diodes 60, 68; and in the range of 95% to 100% by conduction in the second, third and fourth diodes 60, 68, 82.

It is preferred that the density non-linearities appearing throughout the color-reproduction system be compensated for, as described above. However, for some purposes, the photographic and scanning non-linearities may be relatively insignificant. Under such circumstances, the circuit shown in Figure 5 may be adapted to compensate only for the non-linear characteristic of the printing process shown in Figures 2 and 3. The non-linear characteristics of other printing processes, such as offset lithography and gravure, may also be determined and compensated for. A system for doing this will be apparent to one skilled in the art from the above description of the invention.

The circuit described above is a preferred embodiment of the invention. However, the invention is not limited in its application to any particular form of function generator. For example, another type of circuit for generating a non-linear function that may be used is described in the article by O. Schade in "Journal of Motion Picture and Television Engineers," vol. 56, February 1951, pages 163–175, entitled "Image Gradation, Graininess and Sharpness in Television and Motion Picture Systems."

As is seen from the above description of this invention, a simple system for compensating for density non-linearities in the printing process and in other processes of a color-production system is provided. As a result, handwork in the photoengravings to correct tone distortions due to these non-linearities is greatly reduced or is no longer necessary. As a result of this tone-compensation system together with a color-correction system such as described above, handwork of the photoengravings may be eliminated or substantially reduced.

What is claimed is:

1. In a system for obtaining a printed color reproduction of a subject having color characteristics, said color reproduction being produced by a colored-ink printing process having non-linear characteristics, the combination of means for scanning said subject to provide uncorrected electrical signals representative of the density values of color components of said subject, means for generating color-corrected electrical signals in accordance with said uncorrected signals, a tone compensator circuit means responsive to said color-corrected signals for generating other electrical signals representative of a predetermined non-linear function of said corrected signals, different portions of said function having different slopes for compensating for different non-linear density characteristics of said printing process, signal responsive recording means, and means for applying said non-linear function signals to said recording means.

2. In a system for obtaining a printed color reproduction of a subject having color characteristics, said color reproduction being produced by a letterpress ink-printing process including half-toning and etching and having non-linear characteristics, the combination of means for scanning said subject to provide uncorrected electrical signals representative of color components of said subject, means for generating color corrected electrical signals in accordance with said uncorrected signals, a tone compensator circuit means responsive to said color-corrected signals for generating other signals in accordance with a predetermined function of said corrected signals, said function being non-linear with respect to density and including the inverse of the non-linear characteristics of said printing process, signal responsive recording means and means for applying said non-linear function signals to said recording means.

3. In a system for obtaining a printed colored-ink reproduction from an original subject wherein different steps of the printing process produce different non-linear density characteristics, the combination of means for scanning said subject to provide electrical signals representative of density values of said subject, a tone compensator circuit means responsive to said electrical signals for generating other signals in accordance with a non-linear predetermined function, said predetermined function having different slopes corresponding to different ones of said non-linear density characteristics, signal responsive recording means, and means for applying to said recording means said non-linear function signals.

4. In a system for obtaining a printed color reproduction of a subject having color characteristics, said color reproduction being produced by a printing process having a non-linear density characteristic, the combination of means for scanning said subject to provide uncorrected electrical signals representative of the density values of color components of said subject, computer means for generating color corrected electrical signals from said uncorrected signals in accordance with the Neugebauer equations, a tone compensator circuit means responsive to said color-corrected signals for generating other electrical signals representative of a predetermined function of said corrected ink signals, said function being non-linear with respect to density and including the inverse of the non-linear characteristic of said printing process, said non-linear function generating means including a plurality of diodes each having a load resistor, biasing means for rendering each of said diodes conductive during a different portion of the range of said corrected ink signals, signal responsive recording means for exposing a photographic plate, and means for applying said non-linear function signals to said recording means.

5. In a system for obtaining a printed color reproduction of a subject having color characteristics, said color reproduction being produced by a printed process having a non-linear characteristic, the combination of means for scanning said subject to provide uncorrected electrical signals representative of color components of said subject, means for generating color corrected electrical signals in accordance with color component signals received, a tone compensator circuit means responsive to said color-corrected signals for generating other signals in accordance with a predetermined function of signals received, said predetermined function being non-linear with respect to density and including the inverse of said printing process non-linear characteristic, signal responsive recording means, means for applying said uncorrected signals to one of said signal generating means, means for applying the signals generated by said one generating means to the other of said generating means, and means for applying the signals generated by said other generating means to said recording means.

References Cited in the file of this patent

UNITED STATES PATENTS

| | | |
|---|---|---|
| 2,114,325 | Wilkinson | Apr. 19, 1938 |
| 2,252,263 | Kremer | Aug. 12, 1941 |
| 2,316,581 | Hardy | Apr. 13, 1943 |
| 2,331,770 | Gano | Oct. 12, 1945 |
| 2,406,978 | Wendt | Sept. 3, 1946 |
| 2,434,561 | Hardy | Jan. 13, 1948 |
| 2,560,567 | Gunderson | July 17, 1951 |
| 2,567,691 | Bock | Sept. 11, 1951 |
| 2,581,124 | Moe | Jan. 1, 1952 |
| 2,757,571 | Loughren | Aug. 7, 1956 |